(12) United States Patent
Hewitt

(10) Patent No.: US 7,343,732 B2
(45) Date of Patent: Mar. 18, 2008

(54) ROCKET ENGINE CHAMBER WITH LAYERED INTERNAL WALL CHANNELS

(75) Inventor: Ross A. Hewitt, Sacramento, CA (US)

(73) Assignee: Aerojet-General Corporation, Sacramento, CA (US)

( * ) Notice: Subject to any disclaimer, the term of this patent is extended or adjusted under 35 U.S.C. 154(b) by 768 days.

(21) Appl. No.: 10/794,390

(22) Filed: Mar. 2, 2004

(65) Prior Publication Data

US 2006/0144959 A1 Jul. 6, 2006

Related U.S. Application Data

(60) Provisional application No. 60/452,287, filed on Mar. 4, 2003.

(51) Int. Cl.
*F02K 9/64* (2006.01)

(52) U.S. Cl. .................. 60/257; 60/267; 239/127.1

(58) Field of Classification Search ............ 60/257, 60/260, 266, 267, 770; 239/127.1, 127.3
See application file for complete search history.

(56) References Cited

U.S. PATENT DOCUMENTS

| | | | | |
|---|---|---|---|---|
| 3,224,678 A | * | 12/1965 | Rosman | ............ 239/127.1 |
| 3,381,897 A | * | 5/1968 | Wennerstrom | ............ 239/127.1 |
| 3,910,039 A | * | 10/1975 | Fortini | ............ 60/267 |
| 4,055,044 A | * | 10/1977 | Dederra et al. | ............ 60/267 |
| 4,223,530 A | * | 9/1980 | Kirner et al. | ............ 60/267 |
| 6,244,041 B1 | * | 6/2001 | Vasin et al. | ............ 60/258 |

* cited by examiner

*Primary Examiner*—L. J. Casaregola
(74) *Attorney, Agent, or Firm*—Townsend and Townsend and Crew, LLP; M. Henry Heines

(57) ABSTRACT

A combustion chamber/supersonic nozzle assembly is cooled by an array of coolant channels in the wall of the assembly with coolant being fed to the assembly at the throat plane between the subsonic (convergent) and supersonic (divergent) sections. A minor portion of the coolant entering at the throat plane is directed to coolant channels in the supersonic section wall, while the remainder is directed to a complex arrangement of channels in the subsonic section wall. The latter arrangement includes an outer layer of wide axially oriented channels for delivery of coolant to, and removal from, an inner layer of smaller, circumferentially oriented channels that are adjacent to the hot gas and carry the bulk of the coolant load. The path of coolant travel through each inner channel is relatively short, lessening the pressure drop through those channels relative to coolant channel arrangements of the prior art.

18 Claims, 4 Drawing Sheets

ROCKET ENGINE CHAMBER WITH LAYERED INTERNAL WALL CHANNELS

CROSS-REFERENCE TO RELATED APPLICATIONS

This application is related to U.S. Provisional Patent Application No. 60/452,287, filed Mar. 4, 2003, and claims all benefits legally capable of being offered by the provisional patent application. The entire contents of the provisional patent application are incorporated herein by reference.

BACKGROUND OF THE INVENTION

1. Field of the Invention

This invention resides in the field of rocket engine design, with particular applicability to heat exchange structures for rocket chambers and nozzles.

2. Description of the Prior Art

Rocket engines generally require a durable construction that can withstand extreme conditions of temperature and pressure encountered during both takeoff and flight. Extreme conditions are also encountered by other types of equipment, such as hypersonic vehicle surfaces, missile nose tips, radar domes, and the like. Using rocket engines as examples, those for which structural durability is most critical are supersonic engines, ramjets, and SCRAMJETs (supersonic combustion ramjets).

Durability is achieved in these structures by cooling the surfaces of components where high heat is generated. One means of cooling that is used in rocket engines is regenerative cooling, so-called because it draws some of the waste heat energy generated by the engine and recycles it back to the engine to produce a higher thrust. One type of engine in which regenerative cooling is used is an expander cycle rocket engine. In this engine, the internal walls of the combustion chamber and nozzle are cooled by uncombusted fuel fed by a turbopump into a jacket that surrounds the chamber and nozzle. This uncombusted fuel, now heated, is fed directly to the combustion chamber for combustion. The turbopump itself is driven by the heated fuel emerging from the jacket, and the same heated fuel also drives a second turbopump supplying oxidizer to the combustion chamber. A single turbine is often used to drive both turbopumps. The fuel emerging from the turbine and the oxidizer that is pumped by the oxidizer turbopump are both directed to the engine combustion chamber. The expander cycle thus cools the chamber while using heat from the chamber to increase the flow rates of both fuel and oxidizer to the chamber and thereby raise the chamber pressure. Since some of the heat is retained by the fuel, the cycle also serves as a means of preheating the fuel. Coolant jackets are also used in rocket engines that are not of the expander cycle type. Water, for example, is used as a coolant in rocket-based combined cycle (RBCC) engines that are not designed for flight at all.

The coolant jackets typically used in the combustion chamber/nozzle assemblies of rockets consist of a series of coolant channels that run longitudinally along the chamber/nozzle wall, i.e., in the same direction as, although countercurrent to, the flow of the combustion gas within the nozzle. Channels running in this direction limit the efficiency of the heat transfer for several reasons. First, channels that extend the full length of the nozzle cause the coolant to undergo a relatively high pressure drop through the channel due to the length of the channel and the friction at the channel wall. Second, the coolant effect within any single coolant channel is stratified since coolant close to the hot gas bears a larger portion of the heat load than coolant further away from the hot gas. Third, the heat generated in the combustion chamber (generally the subsonic) section of the assembly is much greater than the heat generated in the skirt (generally the supersonic) section, and yet the total volumetric flow rate of coolant is the same in both sections, resulting in inefficient use of the coolant. With these inefficiencies, the temperature of the metal in the nozzle wall remains high and the useful life of the chamber/nozzle is relatively short. Furthermore, to accommodate coolant channels that are large enough to carry the volume of coolant needed to cool both sections of the chamber/nozzle, the jacket and hence the entire wall must be relatively thick which adds considerably to the weight of the assembly.

SUMMARY OF THE INVENTION

The present invention resides in a novel cooling system for a combustion chamber/nozzle assembly of a supersonic rocket. The terms "chamber/nozzle assembly," "chamber/throat/nozzle assembly," and "chamber/nozzle" are used herein interchangeably to denote a supersonic nozzle that incorporates a combustion chamber, i.e., a nozzle containing a convergent section, a throat, and a divergent section with the combustion of fuel and oxidizer occurring in the convergent section. For this reason, the convergent section of the chamber/nozzle is also referred to herein as "the combustion chamber" or just "the chamber."

The cooling system of this invention includes a coolant inlet torus encircling the throat to supply coolant to channels within the wall of the chamber/nozzle. Coolant from the torus is divided into two parts, one directed to channels in the divergent (nozzle) section of the wall and the other to channels in the convergent (chamber) section. The coolant channels in the divergent section direct the coolant to the exit plane of the section and return the coolant leaving the divergent section to the throat plane, where this portion of the coolant joins the coolant in the wall of the convergent section. This division of the entering coolant into two parts permits the proportion fed to each section of the chamber/nozzle to be adjusted to the needs of that section. Thus, since the divergent (nozzle) section generally requires less cooling than the convergent section and the throat, the proportion directed to the divergent section can be relatively small, and preferably much less than half of the total, and the coolant channels in this section can have a relatively small cross section. This allows the divergent section to be constructed with a thinner wall than divergent sections of nozzles where the entire coolant flow passes through both sections.

This invention also resides in an advanced coolant channel configuration for the convergent section. Where channel configurations of the prior art consist of an array of axial coolant channels (i.e., oriented in directions following the projection of the chamber center line on the wall), the configuration of this invention is a combination of two sets of channels at different depths of the wall thickness but in fluid communication to allow coolant to flow from one set of channels to the other. The outer channels are generally oriented in the axial direction and spaced apart around the circumference of the divergent section, distributing coolant along the axial length of the section wall. The function of these outer channels is to transport coolant to and from the sites along the length of the chamber wall where the coolant will engage in heat exchange with the hot gas in the combustion chamber. Accordingly, these outer channels may be termed "manifold channels."

The inner channels are generally circumferential, running in a direction transverse to the outer set and serving as bridges between adjacent channels of the outer set. These inner channels are parallel to each other and spaced apart along the length of the chamber. The inner channels are also smaller in cross section than the outer channels. Since the inner channels are closest to the interior wall of the chamber and the hot gas mixture, these inner channels carry the bulk of the cooling load, and may therefore be termed "heat exchange channels."

In preferred embodiments of the invention, the manifold (outer) channels are each open at one end and closed at the other, and alternate between those whose closed end is the end nearest the exit plane of the chamber and those whose closed end is the end nearest the throat. Thus, if one were to number the manifold channels consecutively, the incoming coolant enters the odd-numbered manifold channels and passes from these channels into the smaller circumferential heat exchange (inner channels) and from there to the even-numbered manifold channels. Upon reaching the open ends of these even-numbered manifold channels, the coolant leaves the jacket. In the case of an expander cycle rocket engine, which again is only one example of an engine in which this channel arrangement can be used, the coolant is the fuel itself and thus the coolant leaving the jacket is directed to the turbine side of the turbopump(s) and from there back to the chamber itself for combustion.

The flow length of coolant in the inner circumferential (heat exchange) channels is defined by the spacing between the outer manifold channels and is therefore sufficiently short that the pressure drop in these inner channels is low. The inner channels can therefore be of much smaller cross section than the outer channels, and the inner channels can be very large in number, depending on the size of each channel and the spacing between adjacent channels. Since the function of the manifold channels is to transfer coolant to and from the inner channels rather than to contribute to the heat transfer between the coolant and the hot combustion gas (or to contribute only to a secondary degree), the outer channels can be of large cross section, and thereby able to carry a large volume of coolant flow per channel without a high pressure drop. Thus, a high total flow rate of coolant through the chamber wall is achieved with a low pressure drop while high cooling efficiency is provided by a large number of short channels of small cross section closest to the hot gases. This results in a rocket engine with cooler metal walls and accordingly a longer useful life.

These and other features of the invention, as well as various preferred embodiments, are described in greater detail below.

DETAILED DESCRIPTION OF THE INVENTION AND PREFERRED EMBODIMENTS

Figure 1:
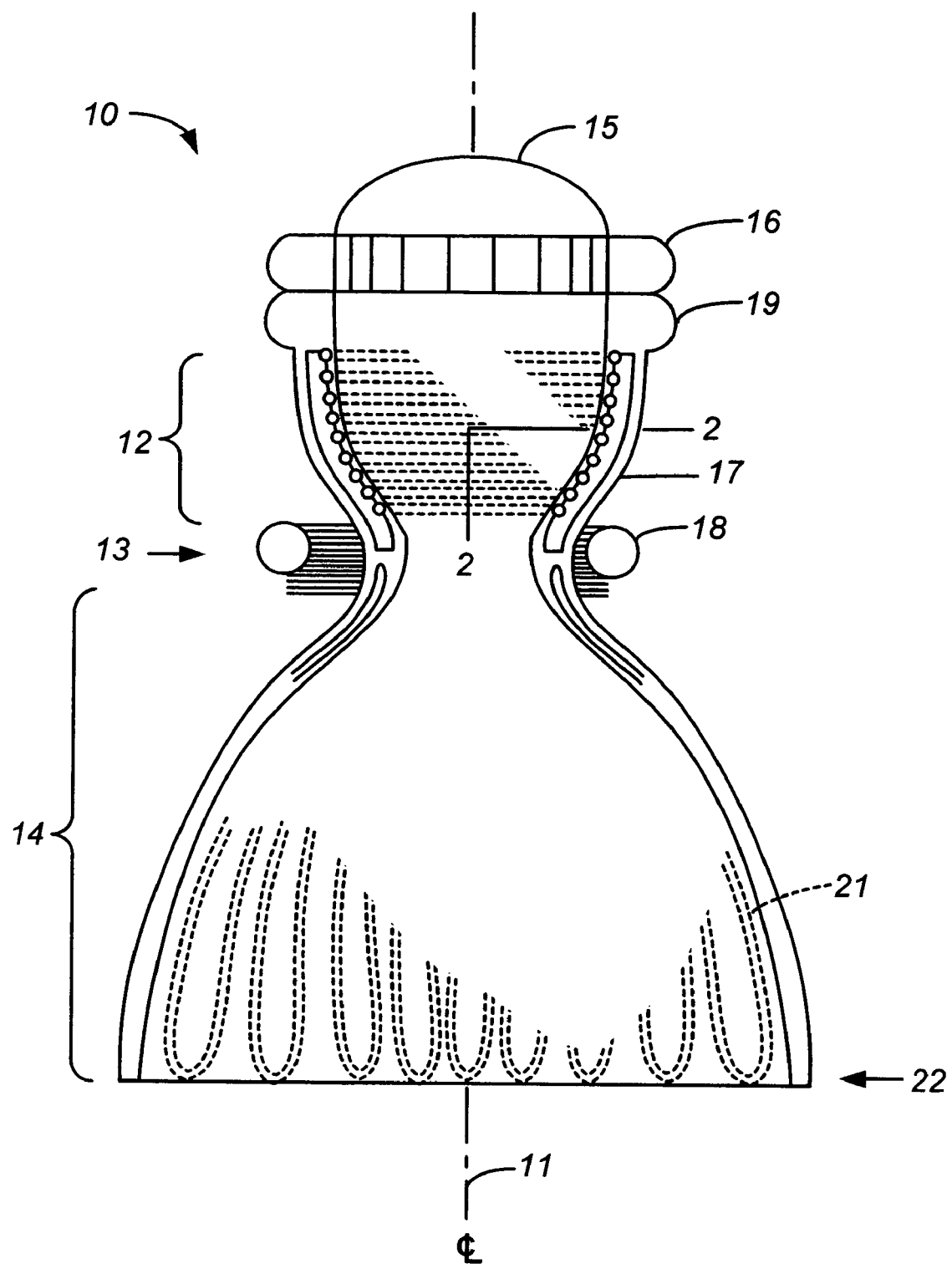
FIG. 1 is a cross section of a chamber/nozzle assembly of a supersonic rocket engine, utilizing the features of the present invention.

As the summary above suggests, this invention is capable of implementation in a variety of ways. The invention and its scope can be readily understood however by a detailed examination of specific embodiments. One such embodiment is shown in the drawings and described below.

A chamber/throat/nozzle assembly that contains the features of the present invention is shown in cross section in FIG. 1. The chamber/nozzle assembly 10 is a body of revolution around a centerline 11 and the cross section is a plane that includes the centerline. The assembly 10 includes a convergent section or chamber 12, a throat 13, and a divergent section 14. Although the assembly is shown with a curved profile with a smoothly curved throat and a large nozzle (divergent section) relative to the chamber, the assembly may alternatively have the shape of two truncated cones both tapering toward and joined at the throat plane, with a sharp-angled throat, or with a chamber that is longer than the nozzle with a wider injection plane. The configuration shown is just one example.

The direction of flow of fuel and oxidizer through the chamber, throat, and nozzle are downward according to the view shown in the Figure. At the inlet end of the convergent section is a fuel injector 15 and an oxygen injector 16 feeding fuel and oxygen respectively to the chamber 12. The oxygen injector 16 is a torus that distributes oxygen across the width of the chamber and mixes the oxygen with the fuel entering through the fuel injector 15. The jacket 17 that surrounds the convergent 12 and divergent 14 sections and the throat 13 contains the coolant channels which are fed by a coolant inlet torus 18 (encircling the throat) through an array of inlet channels (not shown) that filter the coolant and direct it to the appropriate channels in the jacket, which include both the manifold channels at the combustion chamber level and the lower-flow-rate coolant channels at the skirt level. Once the coolant has passed through the jacket and become heated by heat exchange with the hot gas in the chamber/nozzle interior, this heated coolant is typically collected at the injector perimeter, which is shown in the Figure as an outlet torus 19.

A portion of the coolant from the inlet torus enters the coolant channels 21 in the divergent nozzle section 14 of the chamber/nozzle. This portion is preferably less than half of the total coolant feed to the jacket, more preferably a third or less, and in a presently preferred embodiment, approximately 20% of the total. These proportions are achieved either by pumping the coolant through separate pumps at different flow rates or by sizing the channels such that the desired proportions are the result of differences in volumetric capacity or flow resistance within the channels. The divergent section coolant channels 21 (which are shown in dashed lines since they are interior to the wall) are generally axial and are shown spread apart for clarity. Each channel has a 180° turn at the exit plane 22 of the nozzle or at a location before the exit plane so that coolant first travels from the throat 13 toward the exit plane 22 and then returns to the throat 13. The return sections of the channels can be in the same plane (i.e., at the same wall depth) as the forward sections (as shown in the Figure), thereby placing all channel sections in a single layer immediately adjacent to the hot gas wall, or alternatively (and not shown), the return sections can be in an outer layer.

The remainder of the coolant entering from the inlet torus 18 enters the array of channels in the wall of the convergent section 12 of the assembly. The arrangement of these convergent section channels is shown in the succeeding Figures, beginning with FIG. 2, which is a right-angled cross section taken along the line 2-2 of FIG. 1.

Intricate arrays of channels such as those shown in FIG. 2 and discussed below can be formed by platelet technology. Platelet technology is well known in the art, and a representative description can be found in U.S. Pat. Nos. 5,387,398 (Mueggenburg et al., issued Feb. 7, 1995) and 5,804,066 (Mueggenburg et al., issued Sep. 8, 1998), the contents of each of which are incorporated herein by reference in their entirety. As described in these patents, the formation of channels by platelet technology generally begins by applying masks to platelets (thin metallic sheets), either by the application of stencils or by photographic techniques. The platelets are then chemically etched through the masks, and the masks are removed. The platelets are then laminated by either diffusion bonding, roll bonding, brazing, or other conventional techniques for laminating metals. Diffusion bonding is a preferred method for rocket chambers and nozzles and is achieved by hot-pressing the platelets together, using pressures typically in the range of 6.9 to 20.7 MPa (1000 to 3000 psi) and temperatures typically in the range of 450° C. to 550° C. The platelet material can be any heat-conductive material that is capable of being formed into appropriately thin sheets and then etched and laminated by any of the methods listed above. Examples of materials that meet this description are copper, steel, aluminum and other metals commonly used in the construction of rocket combustion chambers and nozzles. The thickness of each platelet can vary and the exact thickness is not critical to the operation of the engine or to the novelty of this invention. In most cases, platelets having thicknesses less than about 0.025 inch (0.064 cm), or within the range of about 0.001 inch (0.00254 cm) to about 0.025 inch (0.064 cm), will provide the best results in terms of ease of manufacture and the formation of channels of the appropriate dimensions. The total number of platelets in the laminate can vary and will be selected on the basis of the desired heat transfer load, the pressure drop and flow rates through the channels, and other general matters of construction, as well as the ability to withstand the conditions expected to be encountered during use. In most cases, the number of platelets will range from 10 to 2,500, and preferably from 20 to 500.

A platelet can be etched either through its entire thickness to produce a hole or an elongated slot, or through only part of the thickness to leave a depression or trough. The formed is known in the art as "through-etching" while the latter is known as "depth etching." A series of through-etched platelets can be laminated with the holes or slots aligned to form a passageway with a dimension transverse to the platelet surfaces that is equal to multiples of the platelet thickness. A depth-etched platelet can be laminated to an unetched platelet to achieve a passageway that has a dimension that is less than one platelet thickness. Two depth-etched platelets can be laminated with the etched regions facing each other to achieve a passageway whose width is the combined depth of the two etched regions. Many combinations and junctions joining passageways can be made by either of these methods.

Figure 2:
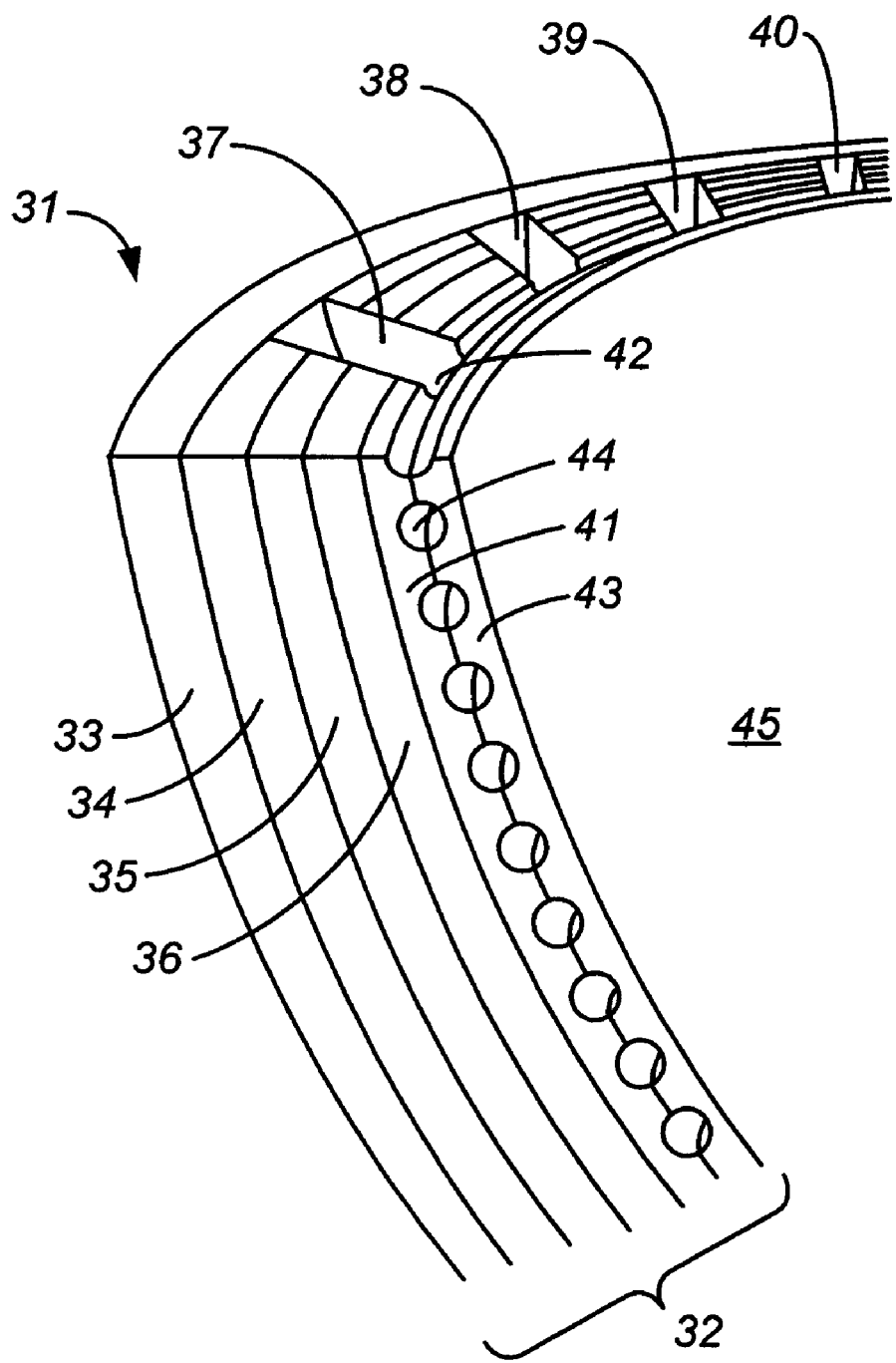
FIG. 2 is a cross section of a portion of the wall of the chamber portion of the assembly of FIG. 1, taken along the line 2-2 of FIG. 1.

The chamber wall 31 (which is also referred to herein as the "jacket") shown in FIG. 2 is a platelet laminate, the Figure showing lines representing the interfaces between the individual platelets 32. The platelet laminate may constitute the entire wall thickness or a portion of the thickness. For example, the wall may have a outer shell of solid metal not formed from platelets or a shell of a non-metallic material.

Figure 4:
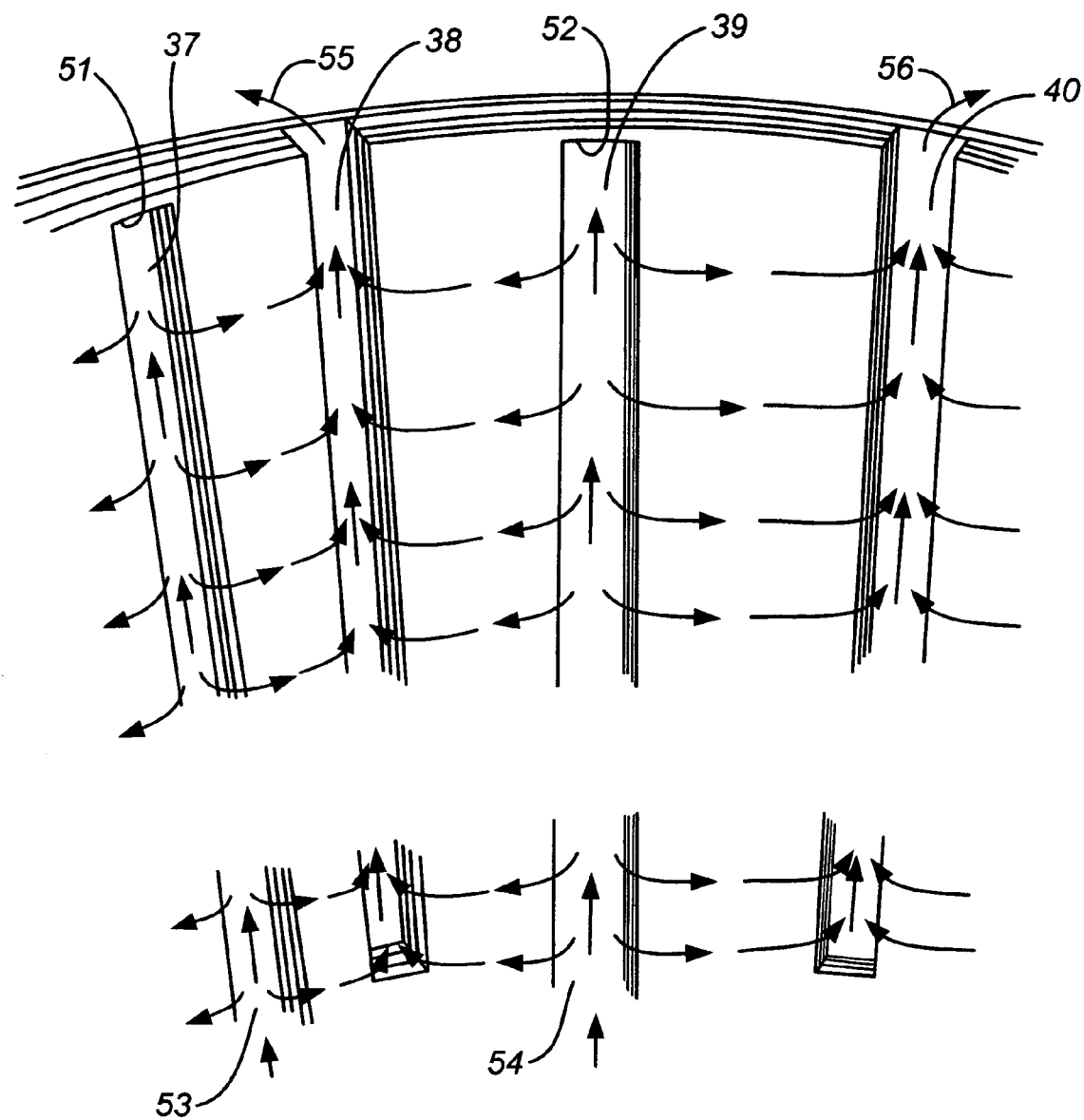
FIG. 4 is a view of a section of the chamber wall of the assembly of FIG. 1, with inner layers removed to reveal the outer components of the wall.

In the example shown in the Figure, the platelet laminate forms the entire wall. The number of platelets shown in this Figure is strictly arbitrary and selected only for purposes of illustration and clarity. A smaller or larger number can be used. In the laminate shown in the Figure, a single outermost platelet 33 that has not been etched serves as the outer skin of the jacket. This single platelet may instead be replaced by two or more platelets or a thick metallic or non-metallic shell. The series of three platelets 34, 35, 36 immediately adjacent to the outer skin platelet 33 are through-etched to form elongated slots extending axially along the length of the chamber, and the slots of adjacent platelets are aligned to form the large axial outer channels of which four 37, 38, 39, 40 are shown. The fourth platelet 41 is depth-etched on both sides, thereby forming troughs on both sides. The troughs on the outer side (which form the inner ends of the manifold channels) are axial in orientation and rectangular in cross section while those on the inner side (which form the outer ends of the heat exchange channels) are transverse or circumferential in orientation and semi-circular in cross section. The troughs meet at their junctions to form a through-passage 42 for coolant to pass from the manifold channels to the heat exchange channels and then back to the manifold channels (as described in more detail below and shown in FIG. 4). The fifth or innermost platelet 43 is depth etched on its outer side to form semi-circular troughs that are transverse or circumferential in orientation to match the circumferential troughs on the outer side of the fourth platelet 41. The matching troughs combine to form the inner circumferential passages 44 (the heat exchange channels), while the inner surface 45 of the innermost platelet remains unetched to contact and retain the hot combustion gases. The manifold channels 37, 38, 39, 40 are thereby in flow communication with the smaller heat exchange channels 44 and thereby feed coolant to and draw coolant from the heat exchange channels through the through-passages 42.

Figure 3:
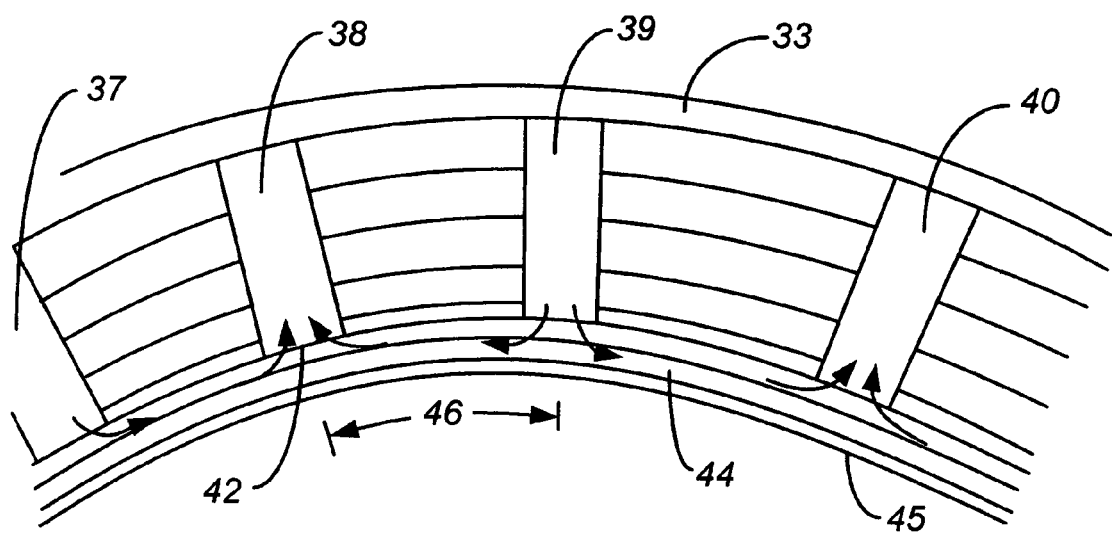
FIG. 3 is a plan view of the cross section of FIG. 2, showing the transverse plane segment of the cross section.

FIG. 3 is a plan view of the platelet and channel arrangement, representing the portion of the cross section of FIG. 2 that is transverse to the axis of the chamber. Since this is a transverse cross section, only one heat exchange (inner circumferential) channel 44 is shown. Coolant is supplied to this channel 43 by every other manifold (outer axial) channel (represented by two manifold channels 37, 39 of the four shown in the Figure), and after passing through the heat exchange channel 44 the coolant leaves by the remaining manifold channels 38, 40.

Thus, the length of travel 46 of the coolant through the heat exchange channel 44 is only the distance between each pair of adjacent manifold channels, even though the heat exchange channel 44 may extend the full circumference of the chamber wall. Due to this relatively short length of travel 46, the pressure drop occurring in the inner channel 44 is low. Although the platelets and channels shown in the drawing are not drawn to scale relative to each other, the outer channels 37, 38, 39, 40 have considerably larger cross sections than the inner channel 44, and have opposing walls that are further apart than those of the inner channel. As a result, the pressure drop per unit length in the outer channels and hence the resistance to flow is much lower than that occurring in the inner channel, whose short length of travel ensures a low pressure drop. Due to their low resistance to flow, the outer channels readily distribute the coolant to all of the inner channels which may extend throughout any portion of the axial length of the chamber and preferably the entire chamber.

Further features of the channel configuration that cause the coolant to flow in the directions described above are shown in FIG. 4. This Figure is a view of the wall from the interior of the chamber with the inner platelets removed to leave only the outer platelets and to show the axially oriented manifold channels. The channel wall is shown with the injection plane of the chamber (not shown) toward the top of the Figure. The coolant outlet torus 19 (also not shown) of FIG. 1 is also at the top of the Figure, and the direction of coolant flow in all of the manifold channels is toward the coolant outlet torus, which is countercurrent to the hot gas flow through the chamber interior. The manifold channels 37, 39 that supply the coolant to the heat exchange channels are closed at their downstream (upper) ends 51, 52 and open at their upstream (lower) ends 53, 54 so that coolant will enter at the upstream ends and pass laterally into the heat exchange channels (not shown). Likewise, the channels 38, 40 that receive coolant from the heat exchange channels are closed at their upstream (lower) ends and open at the downstream (upper) ends to cause the coolant to resume its upward flow to ultimately be discharged as indicated by the arrows 55, 56 into the injector perimeter.

The particular arrangement of platelets shown in these Figures and the channels that are formed by them are merely examples of the general concepts of this invention, which include the use of two sets of channels at different depths in the wall thickness. The channels in general can be either through-etched or depth-etched, and depth-etched channels can have a cross section that is either circular or rectangular. Thus, the channels 21 in the divergent portion 14 shown in FIG. 1 can be either through-etched or depth-etched, although depth etching is preferred for channels that provide the direct heat exchange function, i.e., the channels 21 of the divergent portion and the inner channels 43 of the chamber, since these channels are preferably of very small cross section and the wall separating them from the hot gas is preferably as thin as possible.

While the manifold channels, i.e., those for delivery of the coolant to the heat exchange channels and removal of the coolant leaving the heat exchange channels, are shown as axially oriented and perpendicular to the heat exchange channels, the only requirement is that the two sets of channels be transverse to each other. The angle may thus be other than 90° and either set of channels may be oriented at an acute angle relative to the axis or the circumference of the chamber. One or both sets can be spirally oriented as disclosed in co-pending commonly owned U.S. patent application Ser. No. 10/308,645, filed Dec. 2, 2002, entitled "Nozzle With Spiral Internal Cooling Channels," inventor Ross A. Hewitt, the disclosure of which is incorporated herein in its entirety. Furthermore, while only a single layer of heat exchange channels is shown, multiple layers can be used, thereby accommodating higher volumes of coolant flow with a staged coolant effect.

To summarize, the use of a relatively small portion of the total coolant flow for the divergent section of the chamber/nozzle and the use of a large number of relatively short circumferentially oriented channels to serve the direct cooling function in the chamber offers the following advantages:

(1) By using platelet construction, the wall separating the cooling channels from the hot gas inside the chamber/nozzle can be constructed with an extremely small thickness since this portion of the wall can be formed of a single platelet.

(2) The pressure drop through the coolant passages in the wall is sharply reduced which allows a given flow of coolant to extract more heat from the chamber/nozzle assembly.

(3) With a lesser volumetric flow rate of coolant and coolant passages of smaller cross section, the wall of the convergent section can be thinner, reducing the weight of the entire assembly.

(4) With the coolant inlet torus at the throat plane, a smaller torus can be used, further reducing the weight of the assembly.

While the example shown in these Figures utilizes different channel configurations for the chamber (the convergent section) and the nozzle (the divergent section), certain benefits of this invention can also be retained in assemblies in which the dual-layer arrangement shown in the Figures for the chamber extends into the nozzle as well. The nozzle may thus have an outer layer of axially directed manifold channels and an inner layer of heat exchange channels fed by the outer manifold channels.

In general, the size and spacing of the channels in any set of channels and in any portion of the chamber/nozzle assembly can vary and are not critical to this invention. Using a rocket engine as an example, the dimensions and spacing of the channels will be selected on the basis of the cooling needs of the engine as determined by the size and capacity of the engine and by the conditions and environment in which it will be operated. In most cases, best results will be obtained with heat exchange channels having a cross-sectional area of from about 0.001 square inch to about 0.03 square inch (about 0.0065 cm$^2$ to about 0.76 cm$^2$). As presently contemplated, a typical chamber/nozzle assembly embodying the features of this invention will have heat exchange channels that are either 20 mils square or circular with a diameter of approximately 20 mils (0.020 inch or 0.051 cm), although heat exchange channel sizes up to twice these dimensions are contemplated as well. The manifold channels in these embodiments will have a cross section measuring approximately 50 mils by 100 to 200 mils (0.040 inch or 0.102 cm by 0.1-0.2 inch or 0.26-0.51 cm). The spacing between channels is preferably approximately equal to the width or the smallest dimension of a single channel. For a chamber/nozzle assembly that is 9 inches (23 cm) in length with an inlet 5.5 inches (14 cm) in diameter, a throat 3.3 inches (8.4 cm) in diameter and an outlet 9.9 inches (25 cm) in diameter, a typical number of circumferential heat exchange channel segments in the chamber wall is about 3,000 and a typical number of manifold channels is 24, of which 12 serve as supply channels and 12 as removal channels. Again, these numbers are only examples.

As noted above, the configurations and flow schemes of this invention are applicable to any hot wall, including those on rocket engines and aerospace equipment in general as well as those not intended for flight. Although having a wide range of applicability, the invention is of particular interest as applied to supersonic rocket nozzles which contain a convergent (subsonic) portion, a throat, and a divergent (supersonic) portion. While the invention is applicable to rocket engines that are powered by fluid (preferably liquid) fuel and fluid (preferably liquid) oxidizer, the preferred engines are those that utilize liquid hydrogen as the fuel and liquid oxygen as the oxidizer.

The foregoing description focuses on particular embodiments of the invention for purposes of explanation and illustration. Further embodiments and modifications of the above will be apparent to those skilled in the art upon reviewing this description, such embodiments and modifications falling within the scope of the invention.

What is claimed is:

1. A convergent-divergent rocket nozzle comprising
   convergent and divergent sections meeting at a throat with said divergent section terminating at an exit plane,
   coolant jackets surrounding said convergent and divergent sections,
   an inlet manifold arranged to supply coolant to said coolant jackets through entry ports at said throat,
   a first set of coolant channels in said coolant jacket surrounding said convergent section, and
   a second set of coolant channels in said coolant jacket surrounding said divergent section and extending from said throat toward said exit plane, then turning before reaching said exit plane and continuing back toward said throat,
   said first set of coolant channels arranged to receive a first portion of said coolant entering at said throat, and said second set of coolant channels arranged to receive a second portion of said coolant entering at said throat.

2. The convergent-divergent rocket nozzle of claim 1 wherein said first and second sets of coolant channels are sized such that when equal coolant entry pressures are applied to said first and second sets of coolant channels, coolant flows through said second set of coolant channels at a flow rate that is less than one half of the total coolant flow rate to said nozzle.

3. The convergent-divergent rocket nozzle of claim 1 wherein said first and second sets of coolant channels are sized such that when equal coolant entry pressures are applied to said first and second sets of coolant channels, coolant flows through said second set of coolant channels at a flow rate that is less than one third of the total coolant flow rate to said nozzle.

4. The convergent-divergent rocket nozzle of claim 1 wherein said nozzle is a body of revolution with a nozzle axis, and said channels of said second set of coolant channels are approximately parallel to projections of said nozzle axis on said divergent section jacket.

5. The convergent-divergent rocket nozzle of claim 1 wherein said second set of coolant channels, after reaching said throat, pass across said throat and continue into said coolant jacket surrounding said convergent section.

6. The convergent-divergent rocket nozzle of claim 1 wherein said nozzle is a body of revolution with a nozzle axis, and sections of said second set of coolant channels extending from said throat to said exit plane as well as sections of said second set of coolant channels returning to said throat are both approximately parallel to projections of said nozzle axis on said divergent section jacket.

7. The convergent-divergent rocket nozzle of claim 1 wherein each of said coolant jackets is comprised of a laminate of platelets, each platelet less than about 0.064 cm in thickness, with said coolant channels defined by elongated etched regions in individual platelets.

8. A convergent-divergent rocket nozzle comprising convergent and divergent sections defining a direction of flow of combustion gas through said nozzle, said convergent section surrounded by a coolant jacket in which are formed first and second sets of coolant channels, said channels of said first set oriented substantially parallel to said direction of flow and defined as axial channels, said channels of said second set oriented transverse to said direction of flow and defined as transverse channels, said transverse channels in communication with said axial channels, said axial and transverse channels defining coolant flow paths in which axial channels supplying coolant to said transverse channels alternate with axial channels receiving coolant from said transverse channels.

9. The convergent-divergent rocket nozzle of claim 8 wherein said axial channels are spaced at intervals that are bridged by said transverse channels.

10. A convergent-divergent rocket nozzle comprising convergent and divergent sections defining a direction of flow of combustion gas through said nozzle, said convergent section surrounded by a coolant jacket in which are formed first and second sets of coolant channels, said channels of said first set oriented substantially parallel to said direction of flow and defined as axial channels, said channels of said second set oriented transverse to said direction of flow and defined as transverse channels, said transverse channels in communication with said axial channels, said divergent section having an internal surface facing the interior of said nozzle, and said transverse channels residing between said axial channels and said internal wall surface.

11. The convergent-divergent rocket nozzle of claim 8 wherein said axial and transverse channels have cross sectional areas, said cross sectional areas of said transverse channels being substantially smaller than said cross sectional areas of said axial channels.

12. The convergent-divergent rocket nozzle of claim 8 wherein said axial and transverse channels are substantially perpendicular to each other.

13. The convergent-divergent rocket nozzle of claim 8 wherein said divergent section is a body of revolution, and said axial channels are evenly spaced around the circumference of said divergent section.

14. The convergent-divergent rocket nozzle of claim 8 wherein said coolant jacket is comprised of a laminate of platelets, each platelet less than about 0.064 cm in thickness, with said coolant channels defined by elongated etched regions in individual platelets.

15. The convergent-divergent rocket nozzle of claim 10 wherein said axial and transverse channels have cross sectional areas, said cross sectional areas of said transverse channels being substantially smaller than said cross sectional areas of said axial channels.

16. The convergent-divergent rocket nozzle of claim 10 wherein said axial and transverse channels are substantially perpendicular to each other.

17. The convergent-divergent rocket nozzle of claim 10 wherein said divergent section is a body of revolution, and said axial channels are evenly spaced around the circumference of said divergent section.

18. The convergent-divergent rocket nozzle of claim 10 wherein said coolant jacket is comprised of a laminate of platelets, each platelet less than about 0.064 cm in thickness, with said coolant channels defined by elongated etched regions in individual platelets.

* * * * *